United States Patent [19]

Musch et al.

[11] Patent Number: 4,521,576
[45] Date of Patent: Jun. 4, 1985

[54] CONTINUOUS POLYMERIZATION OF CHLOROPRENE

[75] Inventors: Rüdiger Musch, Bergisch Gladbach; Wilhelm Göbel, Leverkusen; Wolfgang Konter, Neuss; Wilfried Nolte, Leverkusen, all of Fed. Rep. of Germany

[73] Assignee: Bayer Aktiengesellschaft, Leverkusen, Fed. Rep. of Germany

[21] Appl. No.: 556,580

[22] Filed: Nov. 30, 1983

Related U.S. Application Data

[63] Continuation of Ser. No. 354,790, Mar. 4, 1982, abandoned, which is a continuation of Ser. No. 201,920, Oct. 29, 1980, abandoned.

[30] Foreign Application Priority Data

Jan. 25, 1980 [DE] Fed. Rep. of Germany ....... 3002711

[51] Int. Cl.$^3$ .......................... C08F 36/18; C08F 20/20
[52] U.S. Cl. ..................................... 526/213; 526/225; 526/295
[58] Field of Search ............................... 526/213, 225

[56] References Cited

U.S. PATENT DOCUMENTS

| 3,651,037 | 3/1972 | Snow, Jr. | 526/216 |
|---|---|---|---|
| 3,651,038 | 3/1972 | Snow, Jr. | 526/216 |
| 3,838,140 | 9/1974 | Mayer-Mader | 526/295 |
| 3,890,261 | 6/1975 | Fitzgerald | 526/295 |
| 3,981,854 | 9/1976 | Kelley | 528/481 |
| 4,064,337 | 12/1977 | Uraneck | 526/204 |
| 4,245,072 | 1/1981 | Uraneck | 526/195 |

OTHER PUBLICATIONS

Rubber Chem. & Tech. 49, pp. 650, 651; 670–673.

Primary Examiner—Christopher A. Henderson
Attorney, Agent, or Firm—Connolly and Hutz

[57] ABSTRACT

A process for the production of storable polychloroprene having reduced tackiness on mixing rolls by the continuous polymerization of chloroprene and, optionally, up to 50%, by weight, of a monomer copolymerizable with chloroprene in aqueous alkaline emulsion in the presence of emulsifiers and radical initiators at temperatures of from 0° to 70° C., followed by isolation, characterized in that from 90 to 150 parts, by weight, of water, from 2.5 to 4.0 parts, by weight of a potassium salt of disproportionated abietic acid (based on acid), from 0.3 to 1.0 parts, by weight, of a condensation product of naphthalene sulphonic acid and formaldehyde and from 0.2 to 1.5 parts, by weight, of potassium hydroxide, all the quantities being based on 100 parts, by weight, of monomer, are used for the polymerization reaction.

9 Claims, No Drawings

CONTINUOUS POLYMERIZATION OF CHLOROPRENE

CROSS-REFERENCE TO RELATED APPLICATION

This application is a continuation of application Ser. No. 354,790 filed Mar. 4, 1982 and now abandoned which is a continuation of Ser. No. 201,920 filed Oct. 29, 1980, now abandoned.

BACKGROUND OF THE INVENTION

This invention relates to a process for the continuous deposit-free polymerisation of chloroprene in aqueous emulsion in the presence of small quantities of emulsifiers to form stable latices and solid rubbers having improved raw material, mixing and vulcanisate properties.

The polymerisation of chloroprene in aqueous emulsion has long been known and is carried out on an industrial scale (cf. for example Encyclopedia of Polymer Science and Technology, Vol. 3, pages 705–730, Interscience, 1965). This radically controlled polymerisation process takes place very quickly and is accompanied by vigorous evolution of heat. Accordingly, rapid dissipation of the heat of polymerisation is difficult and presupposes a very efficient cooling system. Numerous proposals have been put forward in the patent literature with a view to meeting the stringent demands which are imposed upon the polymer. However, difficulties are involved in the reproducible production of polychloroprene having a uniformly high quality level. Accordingly, it is preferred in practice both for this reason and for economic reasons to polymerise chloroprene in a continuous polymerisation plant.

As those skilled in the art are aware, the raw material and vulcanisate properties of the polymers depend upon the composition of the emulsifier and the concentration thereof in the aqueous emulsion. Although a high emulsifier content increases the polymerisation velocity and improves the stability of the latex, it has an adverse effect upon crucial product properties and, for example, leaves the crude rubber having considerable tackiness on mixing rolls. Accordingly, it would be desirable to reduce the emulsifier content of the polymerisation mixture. As is known, however, the polymerisation velocity decreases with reduced emulsifier content (F. Holscher Dispersionen synthetischer Hochpolymerer [Dispersions of Synthetic High Polymers], Part I, Properties, Production and Testing, Springer-Verlag, Berlin-Heidelberg-New York, 1969, pages 81 et seq). Where polymerisation is carried out continuously, this means a lower monomer conversion in the polymerisation plant for the same residence time.

The monomer conversion may be increased for the same polymerisation temperature either by a longer residence time of the emulsion in the polymerisation plant or by using larger amounts of activator. In either case, reductions in product quality are inevitable.

The mean residence time ($V_z$) of the polymerising chloroprene in the reactor cascade is crucially important if polymerisation is to take place uniformly without interruption and if the polymer is to have uniformly good properties. It is determined in accordance with the following simple formula:

$$V_z = (\Sigma V_k / L)$$

wherein
$V_z$ is the residence time [h];
$\Sigma V_k$ is the sum of the reactor capacities of the polymerisation plant [m$^3$]; and
L is the quantity of latex formed per hour [m$_3$/h].

In a cascade of 7 reactors, $V_z$ is normally from 2 to 4 hours. Where the emulsion has a long residence time in the continuous installation ($V_z > 5$ hours), i.e. where the polymerisation reaction takes place slowly, so-called "popcorn" polymers are formed in addition to the required chloroprene polymer. Popcorn polymers consist of highly cross-linked products which are insoluble in organic solvents. Once popcorn seeds have formed, they grow quickly under the effect of autocatalysis, resulting in blockages in the polymerisation plant, excessive conversion levels and, hence, in the formation of polymers characterised by highly fluctuating properties.

If, by contrast, the residence time is too short ($V_z < 2$ hours), the heat of polymerisation is difficult to dissipate and products having unfavourable raw material and vulcanisate properties are formed. Accordingly, the continuous interference-free polymerisation of chloroprene to form products of high quality is only possible within a certain residence time range.

This continuous polymerisation of chloroprene is known and has been described, for example in U.S. Pat. Nos. 2,384,277; 2,394,291 and 2,831,842.

In order to reach the same reaction velocity in continuous polymerisation as in batch polymerisation, it is either necessary to use more emulsifier or, as described in U.S. Pat. No. 2,394,291, to introduce considerably more activator solution. However, this leads to the formation of deposits in the polymerisation and degassing tract of the polymerisation plant.

Accordingly, continuous interference-free polymerisation in the presence of low concentrations of emulsifier is not possible.

Neither does the continuous polymerisation of chloroprene by means of an emulsifier system of salts of disproportionated abietic acid, fatty acid and non-ionic emulsifiers, as described in DE-OS No. 2,520,339, produce the required result because the non-ionic emulsifiers slow down the polymerisation reaction and the above-mentioned adverse effects occur.

German Offenlegungsschrift Nos. 2,047,449 and 2,047,450 describe processes for the production of polychloroprene latices rich in solids. In these processes, adequate colloidal stability of the latex during polymerisation is only achieved when a combination of 3 emulsifiers and dispersants in precisely defined concentration ranges is used. To obtain adequate latex stability, it is essential that, in addition to the polymeric fatty acids, no less than from 1.5 to 2.0 parts, by weight, of a condensation product of naphthalene sulphonic acid and formaldehyde per 100 parts, by weight, of chloroprene and no more than 1.5 parts, by weight, of a dispersed abietic acid should be added. However, these latices cannot be worked-up into the solid rubber, for example, by low temperature coagulation.

However, products obtained by electrolyte precipitation undergo serious discolouration during drying. Accordingly, it was surprising to find that it is possible, without adding polymeric fatty acids and in the presence of small quantities of condensation products of naphthalene sulphonic acids and formaldehyde, to improve latex stability during the continuous polymerisation reaction, considerably to lengthen the operating time of the polymerisation plant (even where the mixture has a low water content) and to obtain latices which may be readily worked-up, for example, by low temperature coagulation, providing the sodium hydroxide normally used is replaced by potassium hydroxide or by mixtures of other alkali metal hydroxides, such as LiOH, KOH, and CsOH, and the Na-salts of the emulsifiers are replaced by the potassium salts thereof. The reaction velocity of the continuous polymerisation of chloroprene in the presence of low concentrations of emulsifier may be adequately controlled by the choice of the mixture of different alkali metal hydroxides and the concentration thereof in the mixture. Storable latices are obtained in this way and, after working-up into the solid rubber, give products having considerably improved raw material and vulcanisate properties, such as low tackiness on mixing rolls.

SUMMARY OF THE INVENTION

Accordingly, the present invention relates to a process for the continuous polymerization of chloroprene, which may contain up to 50% by weight, of one or more comonomers which are copolymerizable with chloroprene to form latices in an aqueous alkaline emulsion containing from 0.2 to 1.5 parts, by weight, preferably from 0.4 to 0.9 parts, by weight, of KOH per 100 parts, by weight, of monomer and potassium salts of emulsifiers, such as from 2.5 to 4.0 parts, by weight, of disproportionated abietic acid and from 0.3 to 1.0 parts, by weight, of condensation products of naphthalene sulphonic acid and formaldehyde. In the emulsion, which contains from 90 to 150 parts, by weight, preferably from 100 to 130 parts, by weight, of water per 100 parts, by weight, of monomer, up to 60% of the potassium ions may be replaced by other alkali metal ions, such as Li$^\oplus$, or Na$^\oplus$. The exact concentration of potassium ions depends upon the mean residence time of the polymerising chloroprene in the reactor cascade, upon the concentration of emulsifiers and upon the water content of the mixture, although it may readily be determined by those skilled in the art. The process according to the present invention may be advantageously applied both in the batch polymerisation and in the continuous polymerisation of chloroprene, its advantages being particularly apparent in the continuous polymerisation of chloroprene.

DETAILED DESCRIPTION OF THE INVENTION

In the practical application of the present process, chloroprene may be polymerised on its own or may be replaced by a proportion of up to 50% by another compound copolymerisable with chloroprene, such as monovinyl compounds (e.g. acrylonitrile, methacrylonitrile, vinylidene chloride, α-chloroacrylonitrile, methacrylic acid esters and acrylic acid esters), vinyl-substituted aromatic compounds (e.g. styrene and vinyl toluenes) and conjugated diene compounds (e.g. 1,3-butadiene, 1-chloro-1,3-butadiene, 2,3-dichloro-1,3-butadiene and 2-chloro-3-methyl-1,3-butadiene).

Other suitable comonomers are divinyl compounds, such as diesters of aliphatic dialcohols and ethylenically unsaturated monocarboxylic acids (for example ethylene glycol dimethacrylate and ethylene glycol diacrylate) or sulplur.

The polymerisation reaction is carried out in aqueous alkaline emulsion in the presence of radial initiators. Suitable emulsifier systems are potassium salts of water-soluble saturated or unsaturated monocarboxylic acids, for example disproportionated resinic acids, optionally in admixture with fatty acids, such as oleic acid and coconut oil fatty acids. The emulsifiers are generally added in quantities of from 2.5 to 4.0 parts, by weight, preferably from 2.8 to 3.3 parts, by weight, based on 100 parts, by weight, of monomer.

Consdensation products of naphthalene sulphonic acid and formaldehyde are also used as additional emulsifiers. In this connection, it has been found to be desirable to add from 0.4 to 0.8 part, by weight, of these surface-active compounds per 100 parts, by weight, of monomer. In addition, it is precisely in cases where the mixture has a low water content that latex stability may be additionally increased by adding from 0.1 to 0.5 part, by weight, of sodium hexametaphosphate per 100 parts by weight of monomer.

Chain-transfer agents, such as alkyl mercaptans or dialkyl xanthogen disulphides, are added for the purpose of regulating molecular weight. The quantity in which the mercaptan, for example dodecyl mercaptan, is used influences the molecular weight of the polymer formed. The average molecular weight of the polymer decreases with increasing addition of mercaptan, as reflected in the falling Mooney viscosity of the products.

The reaction product has a favourable Mooney range for further processing when the mercaptan is added in quantities of from 0.1 to 0.3 part, by weight, per 100 parts, by weight, of monomer.

The quantities of chain-transfer agents necessary for obtaining a required polymer viscosity may readily be determined by those skilled in the art.

If the emulsifier system according to the present invention is used, the emulsion has to be adjusted to a pH of above 10, perferably from 11 to 13.5.

The polymerisation reaction is initiated by the addition of known polymerisation initiators. Suitable initiators are radical-forming compounds, such as alkali metal persulphates, hydrogen peroxide and organic peroxides, such as cumene hydroperoxide or benzoyl peroxide. The polymerisation reaction may also be initiated by the addition of reducing agents, such as formamidine sulphinic acid. The temperature prevailing during the polymerisation reaction may be from 0° to 70° C., preferably from 30° to 50° C. The monomer conversion should not exceed 85% and is normally from 68 to 58% in the case of benzene-soluble polymers and from 75 to 85% in the case of benzene-insoluble cross-linked polymers. Polymerisation is terminated by the addition of inhibitors, such as phenothiazine. Residual unreacted monomer may be removed by steam distillation. The pH of the alkaline latex is reduced to from 5 to 7, preferably from 6.0 to 6.5, using dilute acetic acid and the polymer is isolated from this emulsion, for example by low temperature coagulation, and dried as described, for example, in Chem. Engng. Progr. 43, 391 (1974) and in German Pat. No. 1,051,306. However, working-up may also be carried out by other conventional methods, as described, for example, in German Pat. No. 1,111,804.

The present invention is illustrated by the following Examples:

EXAMPLE 1

(Comparison Example)

The aqueous phase (W) and the monomer phase (M) are introduced in a constant ratio (through a measuring and control system) together with the activator phase (A) into the first reactor of a polymerisation cascade consisting of 7 identical reactors each having a volume of 50 liters. The average residence time per reactor is 25 minutes.

(Reactors of the type described in German Offenlegungsschrift No. 2,650,714 were used.)

| (M) = Monomer Phase: | |
| --- | --- |
| chloroprene | 95.0 parts, by weight |
| 2,3-dichloro-1,3-butadiene | 5.0 parts, by weight |
| n-dodecyl mercaptan | 0.22 part, by weight |
| phenothiazine | 0.015 part, by weight |
| (W) = Aqueous Phase: | |
| deionised water | 130.0 parts, by weight |
| sodium salt of a disproportionated abietic acid | 4.0 parts, by weight |
| sodium salt of a condensation product of naphthalene sulphonic acid and formaldehyde | 0.7 part, by weight |
| caustic soda | 0.63 part, by weight |
| (A) = Activator Phase: | |
| 1% by weight aqueous formamide sulphinic acid solution | 0.05 part, by weight |

The reaction begins at an internal temperature of 40° C. External cooling dissipates the heat of polymerisation liberated and maintains the polymerisation temperature at +45° C. The reaction is terminated at a monomer conversion of 66% by the addition of phenothiazine. The residual monomer is removed from the polymer by steam distillation and, after the pH has been reduced to 7.0, the polymer latex is coagulated and isolated on cooling rolls. The polymer has a Mooney viscosity (ML 4') of 45 Mooney units.

After a polymerisation time of 120 hours, the polymerisation cascade is run down. 6 kg of polymeric deposits have collected in the reactors over this period.

EXAMPLE 2

(Comparison Example)

Reduction of the emulsifier concentration

Polymerisation is carried out in the same way as in Comparison Example 1, but using an aqueous phase which, instead of 4.0 parts, contains 2.8 parts of the sodium salt of a disproportionated abietic acid. The polymerisation reaction takes place slowly and the monomer conversion may only be increased to 48% (required level 65%), despite a considerably greater input of activator (cf. Table 1). After it had been in progress for 26 hours, the polymerisation reaction had to be stopped because the pipe system between the reactors is blocked by deposits. 28 kg of coagulate were removed from the installation.

EXAMPLE 3

(Comparsion Example)

Lengthening the mean residence time

The procedure is as described in Example 2, except that the mean residence time of the latex per reactor is increased from 25 minutes to 40 minutes. Although this measure enables the final conversion of 65% to be reached despite a lower consumption of activator, the first greasy deposits appear after an operating time of only 19 hours, increasing to such an extent that the reaction has to be terminated after 46 hours. The product has a Mooney viscosity ML-4' for 46 Mooney units.

EXAMPLE 4

(Comparison Example)

Reduction of the water content of the mixture

The procedure is as in Example 1, except that, instead of 130 parts, the aqueous phase contains 110 parts of water. The polymerisation reaction is terminated after 40 hours. 7 kg of polymeric deposits have collected in the reactors. The first deposits are formed in the latex after a storage time of 3 days. The pH of the latex cannot be lowered to pH 7.0 for working-up, because the polymer actually coagulates and precipitates at pH 7.2. Accordingly, the polymer is isolated at pH 7.5. The dried polymer has a Mooney viscosity ML-4' of 44 Mooney units.

EXAMPLE 5

(Comparison Example)

Lower concentrations of water and emulsifier in the mixture

The procedure is as in Example 2, except that the water content is additionally reduced to 110 parts. The monomer conversion is only 40%, despite a high consumption of activator. Polymerisation is terminated after 16 hours, by which time 21 kg of deposits have collected in the reactors.

EXAMPLE 6

(KOH as the alkali component)

The procedure is as described in Example 1, except that the sodium hydroxide in the aqueous phase (W) is replaced by equimolar quantities of potassium hydroxide. Despite a lower consumption of activator, the polymerisation reaction takes place more uniformly and, even after a polymerisation time of 120 hours, the reactors do not contain any deposits. The polymer has a Mooney viscosity ML-4' of 47 Mooney units.

EXAMPLE 7

Reduction of the emulsifier concentration

The procedure is as in Example 2, except that the sodium hydroxide is replaced by equimolar quantities of potassium hydroxide. The monomer conversion of 65% is reached with a low consumption of activator. After a polymerisation time of 120 hours, the reactors do not contain any deposits. The polymer has a Mooney viscosity ML-4' of 45 Mooney units.

EXAMPLE 8

Reduction of the water content in the mixture

The procedure is as in Example 4, except that the sodium hydroxide is replaced by equimolar quantities of potassium hydroxide. After a polymerisation time of 120 hours, the reactors contain 1 kg of deposits. The polymer has a Mooney viscosity ML-4' of 43 Mooney units.

EXAMPLE 9

Lower concentrations of water and emulsifier in the mixture

The procedure is as in Example 5, except that the sodium hydroxide is replaced by equimolar quantities of potassium hydroxide. After a polymerisation time of 120 hours, the reactors contain 2 kg of deposits. The latex is stable in storage and may be coagulated and isolated on cooling rolls at pH 7. The coagulated polymer is elastic and easy to dry. The polymer has a Mooney viscosity ML-4' of 46 Mooney units.

| Example No. | Water in the mixture (parts by weight) | Emulsifier[1] (parts by weight) | $Na^{\oplus}$[2] $(10^{-2})$ | $K^{\oplus}$[2] $(10^{-2})$ | Activator[3] consumption in the reactors | | Monomer conversion (%) |
|---|---|---|---|---|---|---|---|
| | | | | | 1 | 2–7 | |
| 1 | 130 | 4.0 | 3.10 | 0 | 0.04 | 0.01 | 66 |
| 2 | 130 | 2.8 | 2.72 | 0 | 0.10 | 0.07 | 48 |
| 3[4] | 130 | 2.8 | 2.72 | 0 | 0.05 | 0.02 | 65 |
| 4 | 110 | 4.0 | 3.10 | 0 | 0.04 | 0.04 | 65 |
| 5 | 110 | 2.8 | 2.72 | 0 | 0.11 | 0.03 | 40 |
| 6 | 130 | 4.0 | 1.50 | 1.60 | 0.010 | 0.018 | 65 |
| 7 | 130 | 2.8 | 1.12 | 1.60 | 0.010 | 0.008 | 65 |
| 8 | 110 | 4.0 | 1.50 | 1.60 | 0.008 | 0.002 | 65 |
| 9 | 110 | 2.8 | 1.12 | 1.60 | 0.010 | 0.001 | 65 |

[1] sodium salt of disproportionated abietic acid
[2] moles/100 parts of monomer
[3] 1% by weight aqueous formamidine sulphinic acid
[4] residence time 280 minutes As shown in Examples 1 to 5, a reduction in the emulsifier concentration (Example 2) or a lower water content in the mixture (Example 4) or both (Example 5) leads, in the absence of $K^{\oplus}$ ions, to heavy deposits in the polymerisation reactors and to premature termination of the continuous polymerisation process. The required monomer conversion is reached with difficulty, if at all. Even partial replacement of the $Na^{\oplus}$ ions by $K^{\oplus}$ ions (Examples 6 to 9) is sufficient to eliminate these difficulties. Storable latices which are easy to work-up are obtained.

EXAMPLE 10

(Cross-linked Polychloroprene, Comparison Example)

The following 3 phases are introduced in the same way as described in Example 1:

| (M) = Monomer Phase: | |
|---|---|
| chloroprene | 90.0 parts, by weight |
| ethylene glycol dimethacrylate | 10.0 parts, by weight |
| n-dodecyl mercaptan | 0.4 part, by weight |
| phenothiazine | 0.015 part, by weight |
| (W) = Aqueous Phase: | |
| deionised water | 130.0 parts, by weight |
| sodium salt of a disproportionated abietic acid | 4.0 parts, by weight |
| sodium salt of a condensation product of naphthalene sulphonic acid and formaldehyde | 0.7 part, by weight |
| caustic soda | 0.3 part, by weight |
| (A) = Activator Phase: | |
| 1% by weight aqueous formamidine sulphinic acid solution | ≈0.05 part, by weight |

The reaction is terminated at a monomer conversion of 80% by the addition of phenothiazine. The residual monomer is removed from the polymer by steam distillation. The polymer latex begins to agglomerate after only 24 hours and precipitates after 3 days.

EXAMPLE 11

(Cross-linked Polychloroprene)

The procedure is as described in Example 10, except that a different aqueous phase is used.

| (W) = Aqueous Phase: | |
|---|---|
| deionised water | 130.0 parts, by weight |
| potassium salt of a disproportionated abietic acid | 3.0 parts, by weight |
| potassium salt of a condensation product of naphthalene sulphonic acid and formaldehyde | 0.7 part, by weight |
| potassium hydroxide | 0.42 part, by weight |

The polymer latex is stable in storage and does not contain any deposits after storage for 1 week.

EXAMPLE 12

(Comparison Example)

The procedure is as described in Example 1, except that the 5 parts, by weight, of 2,3-dichloro-1,3-butadiene are replaced by the same quantity of chloroprene. The polymer has a Mooney viscosity ML-4' of 46 Mooney units.

EXAMPLE 13

The procedure is as described in Example 7, except that the comonomer, 2,3-dichloro-1,3-butadiene, is replaced by the same quantity in parts, by weight, of chloroprene. The polymer has a Mooney viscosity ML-4' of 47 Mooney units.

EXAMPLES 14 and 15

Tackiness on mixing rolls/calender test

The reduced tackiness of the polymers according to the present invention on mixing rolls is demonstrated by a practical test. The following substances are first mixed for 4 minutes in a laboratory kneader:

| | |
|---|---|
| polymer | 100 parts, by weight |
| carbon black N-472 | 30 parts, by weight |
| aromatic mineral oil | 15 parts, by weight |
| phenyl-α-naphthyl amine | 1 part, by weight |
| stearic acid | 0.5 part, by weight |
| magnesium oxide | 4 parts, by weight |

-continued

| | |
|---|---|
| zinc oxide | 5 parts, by weight |

After storage for approximately 24 hours at room temperature, the mixture is preheated to from 50° to 55° C. on mixing rolls and then drawn out into a 0.5 mm thick band on a 3-roll laboratory calendar (roll length 400 mm; roll diameter 200 mm) with friction ratios of 1:1.31 between the first and second rolls and 1:1 between the second and third rolls.

Assessment of the operation as a whole:

| | Number: Assessment of tackiness: |
|---|---|
| 1 = | sheet does not stick (is not entrained by the faster roll) |
| 2 = | sheet sticks slightly (is entrained to some extent by the faster roll) |
| 3 = | sheet sticks slightly (is entrained by the faster roll) |
| 4 = | sheet sticks firmly (may only be removed with effort) |

| Set-ting | Temperature of the rolls (°C.) | | | Example 14 polymer of Example | | Example 15 polymer of Example | |
|---|---|---|---|---|---|---|---|
| | 1 | 2 | 3 | 7 | 1 (comparison) | 13 | 12 (comparison) |
| A | 35 | 40 | 50 | 2 | 4 | 1–2 | 3 |
| B | 40 | 45 | 55 | 2–3 | 4 | 2 | 4 |
| C | 43 | 52 | 60 | 3 | —[1] | 2–3 | 4 |

[1]cannot be measured

The results set out in the Table show that the polymers according to the present invention (Examples 7 and 13) cause far less tackiness on mixing rolls that the conventional polymers, i.e. a significant factor in the overall processing behaviour was distinctly improved.

EXAMPLES 16 and 17

(Vulcanisation Behaviour)

A carbon black mixture corresponding to ISO 2475 is tested for its vulcanisation behaviour (in accordance with DIN 53 529) in a Bayer-Frank vulcameter at 130°, 140° and 150° C.:

| Ex. No. | Polymer of | Temperature | | |
|---|---|---|---|---|
| | | 130° C. $t_s$ mins. | $t_{10}$ mins. | 150° C. $t_{80}$ |
| 16 | Example 7 | 16 | 4 | 17 |
| | Example 1 (comparison) | 14 | 3 | 20 |
| 17 | Example 13 | 14 | 4 | 15 |
| | Example 12 (comparison) | 11 | 3 | 17 |

These data are indicative of a considerable technological advantage afforded by the polymer mixture according to the present invention because a longer scorch time is accompanied by a shorter cure time. This results in an advantageous higher cross-link density of the vulcanisates.

EXAMPLE 18

(Testing of vulcanisates)

Testing of the polychloroprene rubbers produced in accordance with the present invention: standard test according to ISO-specification 2475-1975 (E).

Vulcanisate Properties vulcanisation temperature: 150° C.
heating times: 20, 40 and 60 minutes (ring I)
test: F, D, S 100/300% (DIN 53 504); mean values from three heating stages
H 20°/70° C. (DIN 53 505)
E (DIN 53 512)
F=strength; D=elongation; S=modulus; H=hardness
E=elasticity

| Polymer of Example: | Polymer Testing | | | | |
|---|---|---|---|---|---|
| | | | Vulcanisate Properties (150° C.) | | |
| | F (MPa) | D (%) | S 300% (MPa) | H 20/70° C. (Shore A) | E (%) |
| 7 | 18.1 | 446 | 10.4 | 64 | 50 |
| 1 (comparison) | 17.9 | 430 | 9.2 | 61 | 43 |
| 13 | 19.5 | 460 | 10.2 | 63 | 53 |
| 12 (comparison) | 18.3 | 450 | 9.1 | 60 | 49 |

Commensurate with the shorter cure time, the vulcanisates containing the polymers according to the present invention (Examples 7 and 13) show a higher cross-link density as reflected in the noticeably higher modulus (S), hardness (H) and elasticity (E) values. The strength (F) and elongation (D) values are also increased.

We claim:

1. Process for the continuous polymerization of chloroprene or chloroprene with up to 50% by weight of one or more comonomers which are copolymerization with chloroprene in an aqueous alkaline emulsion at 0° to 70° C. to a monomer conversion of at most 85% and followed by working-up latices to solid rubbers, wherein the aqueous emulsion contains from 0.4 to 0.9 parts by weight of potassium hydroxide, from 2.8 to 3.3 parts by weight of a potassium salt of disproportionated abietic acid, from 0.4 to 0.8 parts by weight of condensation products of naphthalene sulphonic acid and formaldehyde, and 100 to 130 parts by weight of water, all quantities being based on 100 parts by weight of monomer, and in the absence of polymeric fatty acids.

2. A process as claimed in claim 1, characterised in that up to 60%, by weight, of the potassium ions are replaced by other alkali metal ions, depending on the mean residence time of the latex in the polymerisation plant.

3. A process as claim in claim 1, characterised in that the alkali metal salts of disproportionated abietic acid are added in quantities of from 2.8 to 3.3 parts, by weight, per 100 parts, by weight, of monomer.

4. A process as claimed in claim 1, characterised in that the condensation product of naphthalene sulphonic acid and formaldehyde is added in quantities of from 0.4 to 0.8 part, by weight, per 100 parts, by weight of monomer.

5. A process as claimed in claim 1, characterised in that from 0.4 to 0.9 part, by weight, of potassium hydroxide is added per 100 parts, by weight, of monomer.

6. A process as claimed in claim 1, characterised in that from 100 to 130 parts, by weight, of water are added per 100 parts, by weight, of monomer.

7. A process as claimed in claim 1, characterised in that polymerisation is carried out at temperatures of from 30° to 50° C.

8. A process as claimed in claim 1, characterised in that the polymer latex is worked-up at a pH of from 5 to 7.

9. A process as claimed in claim 1, characterised in that the polymer latex is worked-up at a pH of from 6.0 to 6.5.

* * * * *